United States Patent [19]
Isozaki

[11] Patent Number: 6,043,901
[45] Date of Patent: Mar. 28, 2000

[54] PRINTING CONTROL FOR AN INFORMATION PROCESSING APPARATUS HAVING INFORMATION READING, PRINTING AND COPYING FUNCTIONS

[75] Inventor: Atsushi Isozaki, Ichinomiya, Japan

[73] Assignee: Brother Kogyo Kabushiki Kaisha, Nagoya, Japan

[21] Appl. No.: 09/084,227

[22] Filed: May 26, 1998

[30] Foreign Application Priority Data

May 30, 1997 [JP] Japan ..................................... 9-142398

[51] Int. Cl.$^7$ ....................................................... H04N 1/21
[52] U.S. Cl. ...................... 358/296; 358/498; 271/10.09; 271/10.11
[58] Field of Search .................................. 358/296, 498, 358/468; 399/371, 387, 86, 217, 394; 400/582; 271/10.09, 10.11, 10.12

[56] References Cited

U.S. PATENT DOCUMENTS

| 4,937,664 | 6/1990 | Chiku et al. ............................... 358/75 |
| 5,072,244 | 12/1991 | Aoki et al. ............................... 346/160 |
| 5,406,358 | 4/1995 | Kimura et al. ........................... 355/271 |
| 5,708,935 | 1/1998 | Rabjohns ................................. 399/193 |
| 5,793,399 | 8/1998 | Kawakami et al. ..................... 347/104 |

Primary Examiner—Kimberly A. Williams
Assistant Examiner—Derrick Fields
Attorney, Agent, or Firm—Oliff & Berridge, PLC

[57] ABSTRACT

In the printing paper cueing in a printing mode in a copying process, cueing of a second cueing length L2 which is smaller by ΔL is performed compared with the printing paper cueing length L1 in a printing process other than the copying process. This shortage of the cued length is compensated for by a length of advance ΔL which is made when meshing a first planetary gear for a transfer to a copying mode. As a result, actual margins of the printing papers become substantially the same between the printing process and the copying process. That is, in a facsimile having a copying function or the like, the margins at the top end of the printing papers can be made the same between when received data is printed and when an original document is copied.

11 Claims, 10 Drawing Sheets

PRINTING PAPER SUPPLY / DISCHARGE MODE

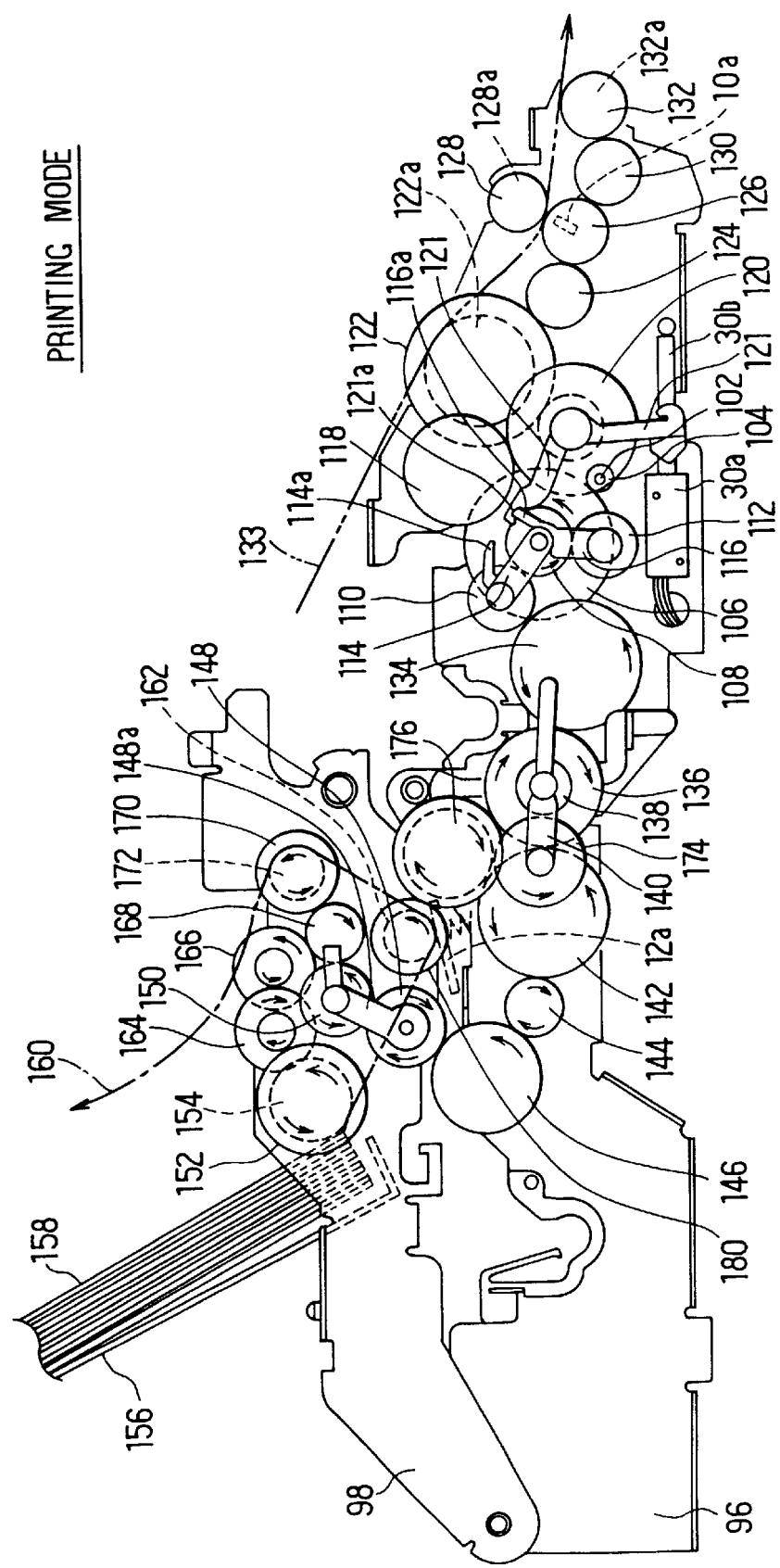

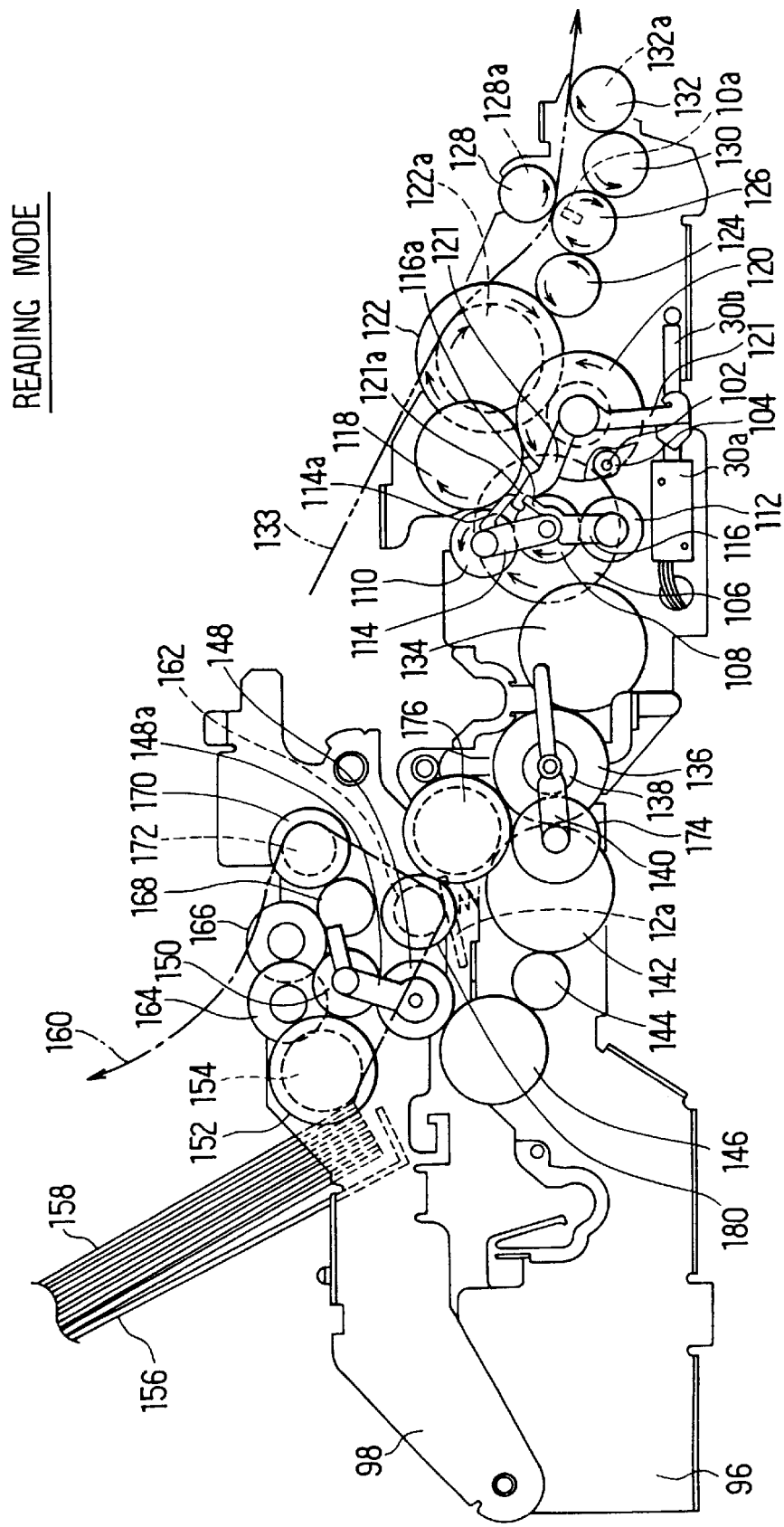

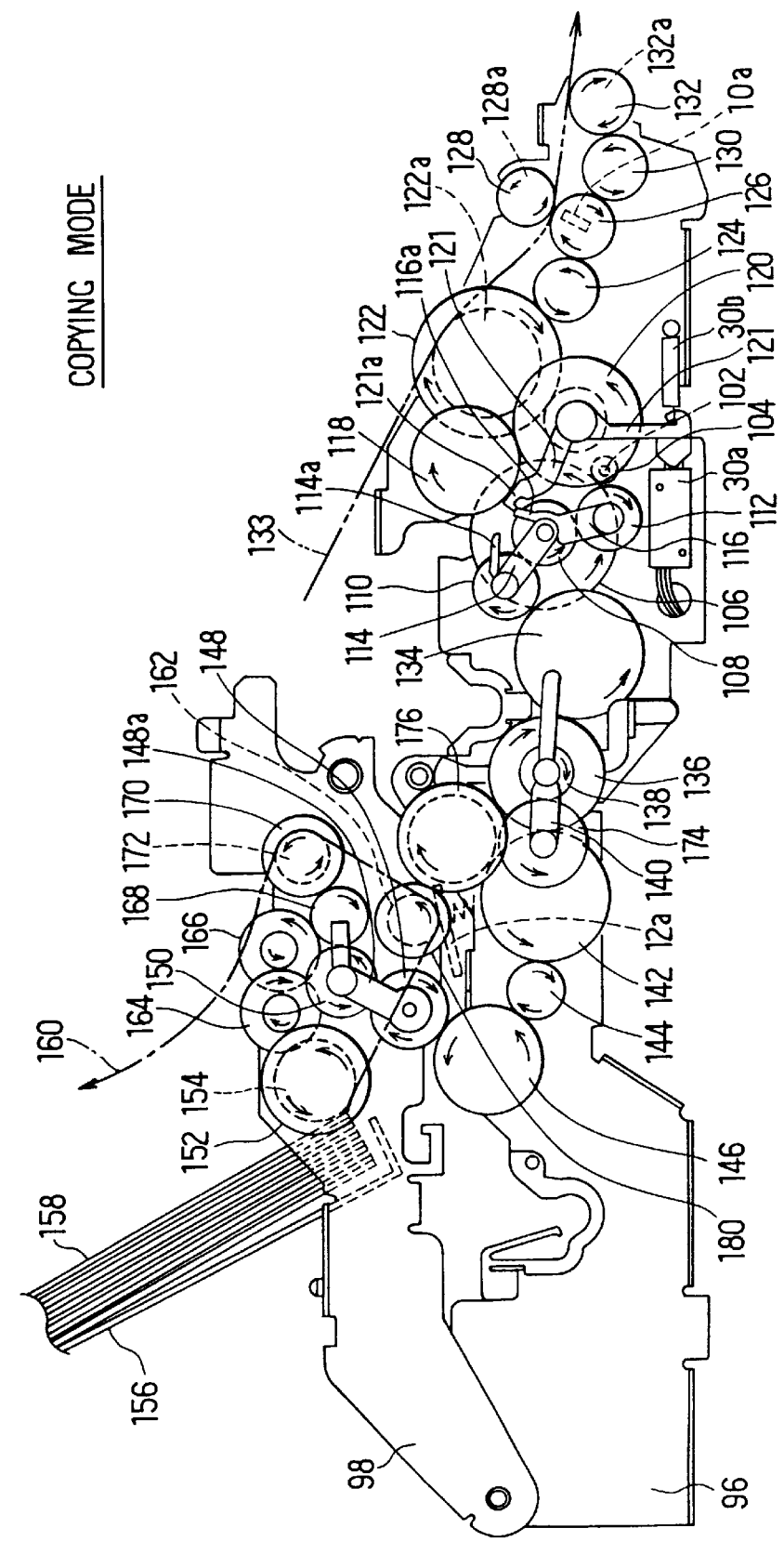
FIG. 11  COPYING MODE

PRINTING CONTROL FOR AN INFORMATION PROCESSING APPARATUS HAVING INFORMATION READING, PRINTING AND COPYING FUNCTIONS

CROSS REFERENCE TO RELATED APPLICATION

This application relates to and incorporates herein by reference Japanese Patent Application No. 9-142398 filed on May 30, 1997.

BACKGROUND OF THE INVENTION

1. Field of the Invention

The present invention relates to a printing control for an information preocessing apparatus such as a facsimile or copying machine.

2. Description of Related Art

Generally, in a printing apparatus incorporated in a facsimile, copying machine or the like, a stepping motor is used for mechanisms for conveying original document and printing paper, and the CPU performs conveyance control thereon according to a control program.

Especially, in a printing apparatus incorporated in a facsimile or copying machine arranged to execute processes other than a printing process, there are a mode for supplying an original document, a mode for reading the original document to be transmitted or copied, a mode for discharging the original document, a mode for supplying a printing paper, a mode for cueing the printing paper, a mode for printing onto the printing paper, a mode for discharging the printing paper. Further, there is other modes in which these modes are executed in combined forms, whereby a number of complex conveyance processes based on the use of the stepping motor are executed while those relevant modes are being changed over. The stepping motor is subjected to a higher mechanical load in the copying (reading and printing) mode than in the printing mode, because it drives two conveyance mechanisms for reading and printing in the copying mode.

As a result, there occurs that the margins at top ends of the printing papers (top end margin) differ from each other between the margin at the top end of the printing paper provided when printing received data such as facsimile data and the margin provided when copying the original document despite the fact that no different control programs which cause differentiation between the both margins is provided.

SUMMARY OF THE INVENTION

It is an object of the present invention to provide a printing control which enables the procurement of the same or uniform top end margin in either of printing of such received data or printing of the original document for copying.

According to a printing control of the present invention, a printing mode is executed immediately before the execution of a copying (reading and printing) mode, thereby performing cueing of a printing paper. When performing this cueing processing, there is differentiated a top margin feed length corresponding to a margin of the printing paper from that corresponding to the cueing of the printing paper in the printing mode in a process other than the copying process in order to make the margin fixed. The differentiation between these two margin feed lengths is realized, in a case where, for example, a deviation between the two margins occurs in such a way that the length of margin in the copying process is larger than that in another process, by performing cueing by making the margin feed length smaller than that in the another process, and, in a case where a deviation between the two margins occurs in such a way that the length of margin in the copying process conversely is smaller than that in another process, by performing cueing by making the margin feed length larger than that in the another process.

Preferably, an intermediary mechanism including a combination of a sun gear and planetary gears as well as a switching mechanism is arranged such that the planetary gears meshed with the sun gear transmit the rotating force of a rotary member to only a printing paper conveyance mechanism, only an original document conveyance mechanism or both of the printing paper conveyance mechanism and the original document conveyance mechanism by being located at the positions of revolution of the planetary gears which are meshed with the sun gear that rotates due to the rotation of the rotary member, thereby realizing one of the printing mode, reading mode and copying mode.

BRIEF DESCRIPTION OF THE DRAWINGS

Other objects, features and advantages of the present invention will be made more apparent by the following detailed description with reference to the accompanying drawings. In the drawings:

FIG. 9 is a schematic view illustrating a state of internal mechanism of the facsimile in a printing mode;

FIG. 10 is a schematic view illustrating a state of internal mechanism of the facsimile in a reading mode; and FIG. 11 is a schematic view illustrating a state of internal mechanism of the facsimile in a copying mode.

DETAILED DESCRIPTION OF THE PREFERRED EMBODIMENT

Figure 1:
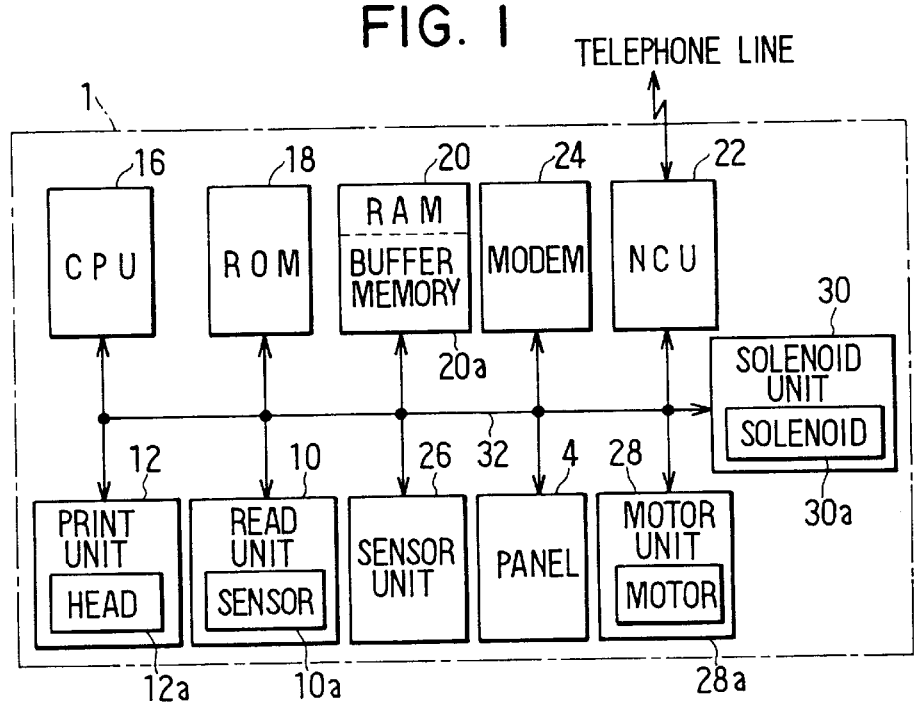
FIG. 1 is a block diagram illustrating a control system of a facsimile to which the present invention is applied.

In a facsimile 1 illustrated in FIG. 1, according to various instruction inputs from a user through an operation panel 4, the facsimile 1 executes settings of various processing operations. Those operations include reading of the image information of an original document in a reading unit 10, converting the information of the original document to transmission data, encoding the transmission data, transmitting and receiving facsimile data, decoding of received data, printing (recording) of the decoded facsimile data onto a paper in a printing unit 12, reading of the original document in the reading unit 10 and printing of the read data onto the printing paper in the printing unit 12 at the time of a copying process, etc.

In order to execute these operations, the facsimile 1 comprises an operation panel 4, the reading unit 12 having a thermal head 12a, a CPU 16, a ROM 18, a RAM 20 having a receiving buffer memory 20a, a network control unit (NCU) 22 enabling transmission and reception of facsimile data to and from another telephone or facsimile, a modem 24 that transmits or receives facsimile data with another facsimile through the NCU 22, the sensor unit 26 having a plurality of sensors for sensing a printing paper, original document and the like during various operations, a motor unit 28 having a pulse-driven stepping motor 28a (7.5°/step) causing the operation of respective mechanisms within the facsimile 1, a solenoid unit 30 having a gear changeover solenoid 30a, a bus line 32 that connects these units and elements to one another, etc. It is to be noted that, although not illustrated, the facsimile 1 is also provided with a receiver, speaker for calling and the like and the conversation with another telephone can be performed through this receiver.

Figure 2:
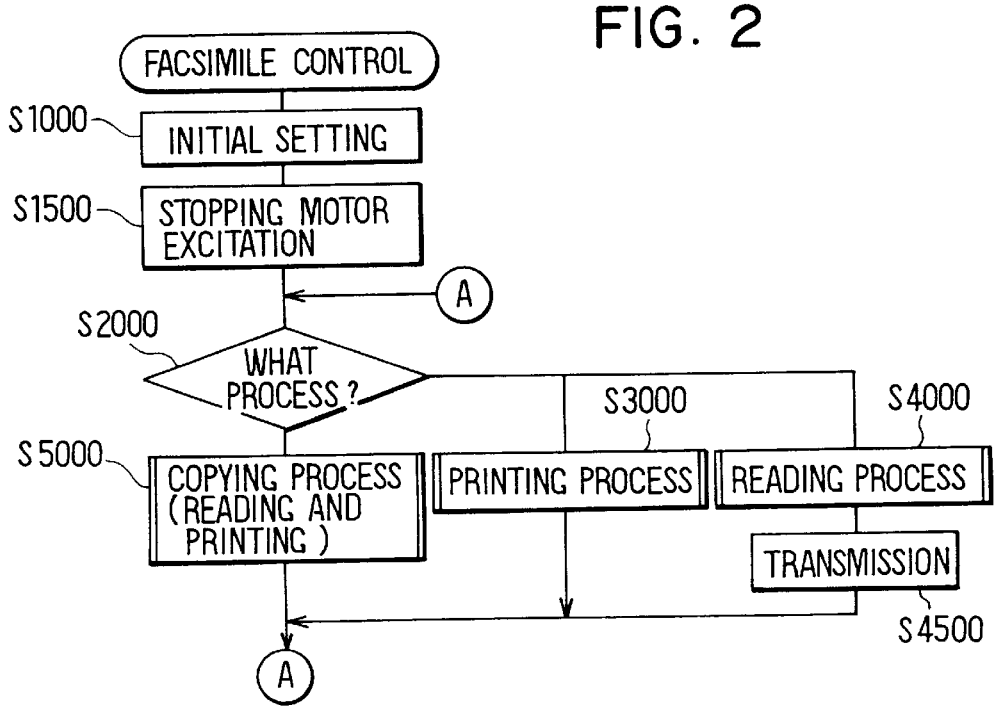
FIG. 2 is a flow chart illustrating a facsimile control process to be executed by a CPU of the control system.

The CPU 16 is programmed to execute a facsimile control process illustrated in FIG. 2 according to the programs stored in the ROM 18.

Upon start of the process, an initial setting is first performed (S1000). In this initial setting, the securement of a working area in the RAM 20 for executing the control process, settings of initial values into this working area, etc. are performed and, further, the mechanical construction of the facsimile 1 is set to an initial mode (home position) illustrated in FIG. 7 through the drive of the stepping motor 28a and the gear changeover solenoid 30a.

Figure 7:
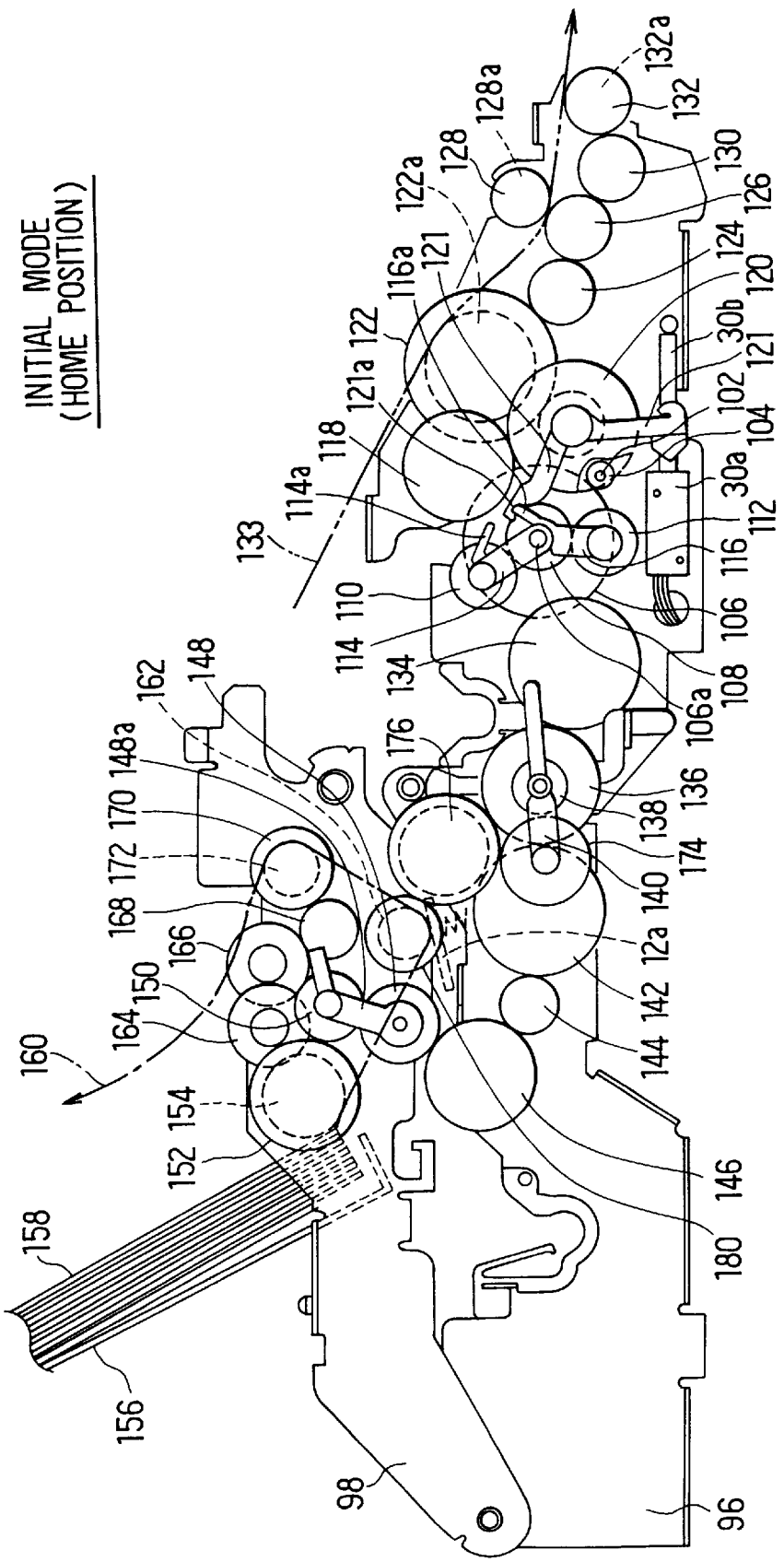
FIG. 7 is a schematic view illustrating a state of internal mechanism of the facsimile in an initial mode.

In FIG. 7 there is illustrated especially a transmission mechanism of transmitting the rotating force of the stepping motor 28a, which stands on the use of grouped gears provided in order to drive conveyance mechanisms of conveying a printing paper and original document. These grouped gears are rotatably supported by support frames 96 and 98.

A motor gear 104 is mounted on an output shaft 102 of the stepping motor 28a, so that the rotating force of the stepping motor 28a is transmitted to a common gear 106 through the output shaft 102 and the motor gear 104. A common sun gear 108 is provided on a common shaft 106a integral with the common gear 106. On the top or forward end of a first lever 114 that is provided coaxially with this common sun gear 108 there is provided a first planetary gear 110 meshed with the common sun gear 108 and, on the top end of a second lever 116 that is provided coaxially with the common sun gear 108 there is provided a second planetary gear 112 meshed with the common sun gear 108, the first and the second planetary gears having the rotating force transmitted respectively thereto from the common sun gear 108.

Each of the first lever 114 and second lever 116 is swingably mounted on the shaft 106a of the common sun gear 108. In the initial mode, the positions of revolution of the first planetary gear 110 and second planetary gear 112 situated on the first lever 114 and second lever 116 are each located at the position meshed with no other gear than the common sun gear 108.

Immediately after the facsimile 1 is set to the initial mode in the initial setting (S1000), an exciting current to the stepping motor 28a is interrupted whereby the excitation is stopped (S1500). Then, the control proceeds to determination step (S2000) wherein wait is made.

Figure 3:
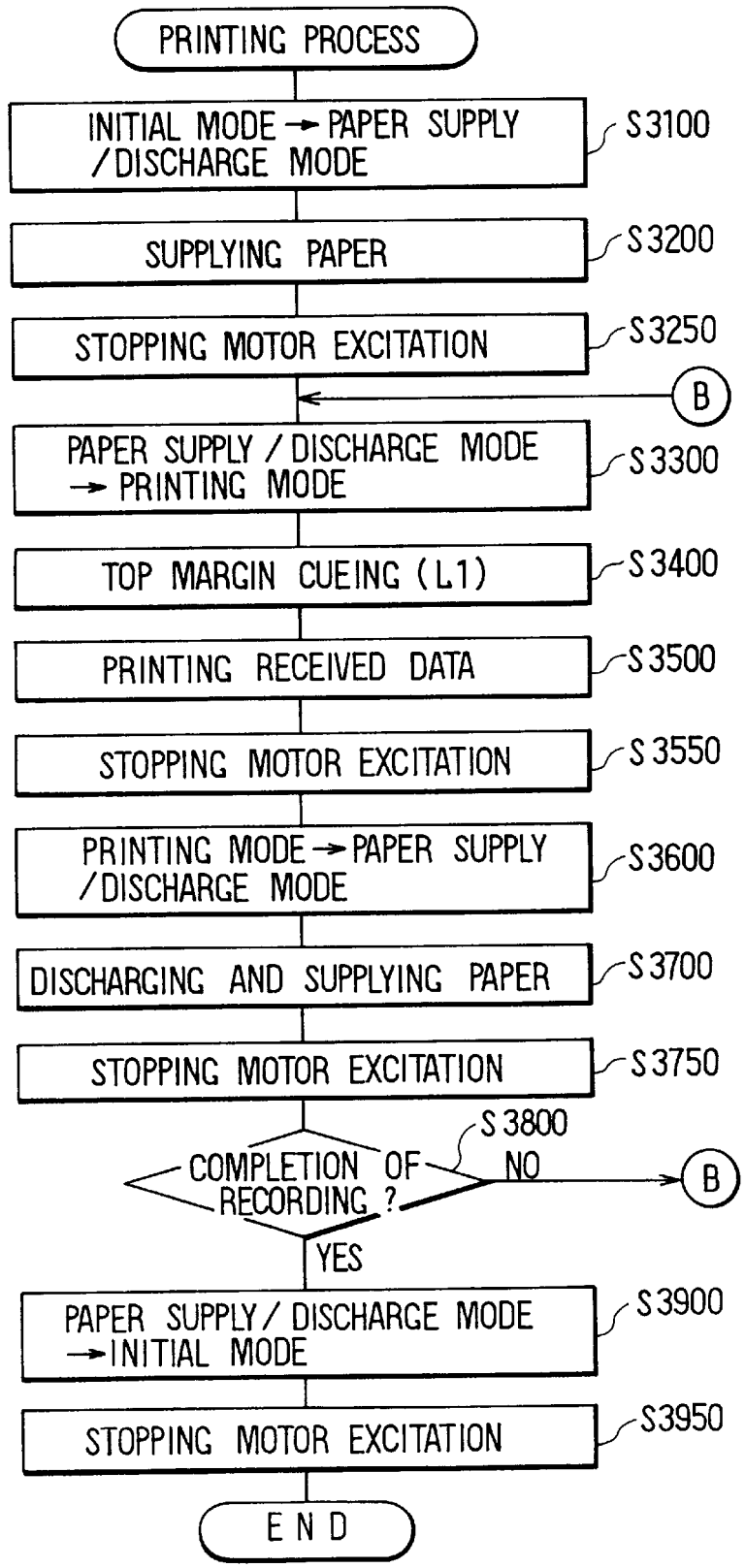
FIG. 3 is a flow chart illustrating a printing process in the facsimile control process.

In this processing (S2000), when the facsimile 1 has received facsimile data from another facsimile through a telephone line, a printing process (S3000) illustrated in FIG. 3 is performed according to a determination made in step S2000.

Initially, changeover of the gears from the initial mode to a paper supply/discharge mode is performed (S3100). First, the gear changeover solenoid 30a is turned off, and the stepping motor 28a is rotated clockwise by a length corresponding to 15 pulses to thereby rotate clockwise the output shaft 102 and motor gear 104 illustrated in FIG. 7. By this clockwise rotation, the common gear 106 is rotated counterclockwise to thereby revolve the first planetary gear 110 in a direction of moving it away from the first reading gear 118. This 15 pulse forward rotation is for the purpose of preventing a pawl 114a of the first lever 114 from being kept, for some reason or other, as have ridden and gotten over a top end of a retention lever 121 provided on a shaft of a second reading gear 120 as in a reading mode as later described and thereby completely separating the pawl 114a from the top end of the retention lever 121.

Next, the gear changeover solenoid 30a is turned on to thereby retract one end of the retention lever 121 into a left side in the figure against the pulling force of a coil spring 30b to thereby rotate clockwise the retention lever 121, thereby separating the pawl 116a provided on the second lever 116 from a retention recess 121a at the other end of the retention lever 121.

Figure 8:
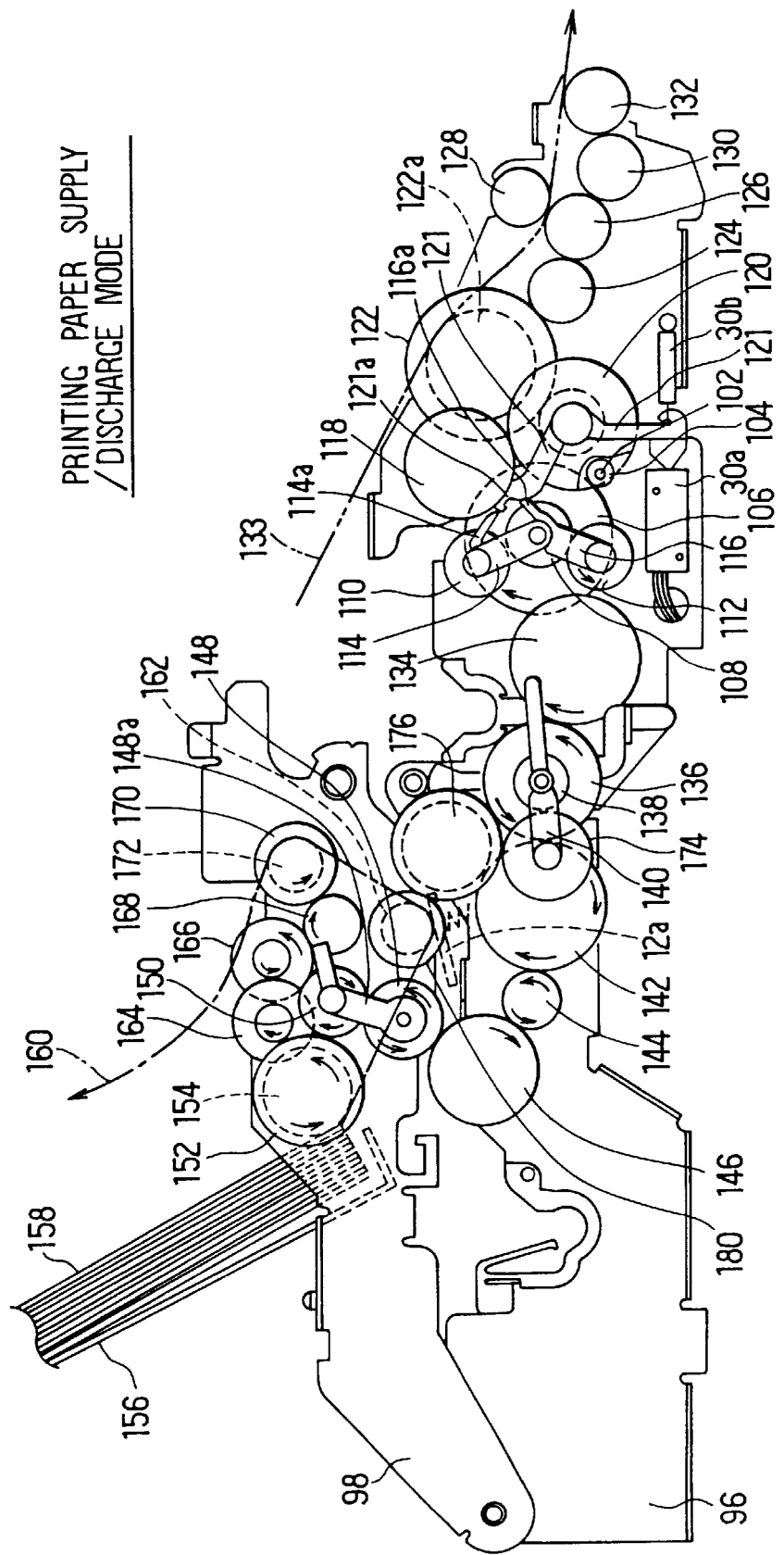
FIG. 8 is a schematic view illustrating a state of internal mechanism of the facsimile in a paper supply/discharge mode.

Subsequently, the stepping motor 28a is rotated in reverse by a length corresponding to 13 pulses to thereby rotate counterclockwise the output shaft 102 and motor gear 104. By this counterclockwise rotation, the common gear 106 is rotated clockwise to revolve clockwise the second planetary gear 112 to thereby cause it to abut against a first paper supply/discharge gear 134 and be meshed therewith. At this time, although the first planetary gear 110 and first lever 114 move toward the first reading gear 118, the pawl 114a of the first lever 114 abuts on the top end of the retention lever 121, with the result that the first planetary gear 110 revolves to a position that is substantially intermediate between the first paper supply/discharge gear 134 and the first reading gear 118 and is stopped. In this way, a state of paper supply/discharge mode illustrated in FIG. 8 is achieved.

Next, a printing paper supply process (S3200) is executed. That is, by rotating in reverse the stepping motor 28a, the rotating force of the motor gear 104 is transmitted to the common gear 106, common sun gear 108, second planetary gear 112 and first paper supply/discharge gear 134. Further, this rotating force is transmitted from the first paper supply/discharge gear 134 to a second paper supply/discharge gear 136, third paper supply/discharge gear 142, fourth paper supply/discharge gear 144, fifth paper supply/discharge gear 146 and first paper supply/discharge sun gear 148. Since the first paper supply/discharge sun gear 148 is rotated counterclockwise, a first paper supply/discharge planetary gear 150 that exists on the top end of a lever 148a that swings on the same shaft as that of the first paper supply/discharge sun gear 148 is meshed with a paper supply roller gear 152.

As a result, the paper supply roller gear 152 is rotated counterclockwise, and a paper supply roller 154 provided on the same shaft as that of the paper supply roller gear 152 draws out a single sheet of paper of printing papers 158 stacked in a paper supply tray 156 and sends it out onto a supply/discharge path 160 indicated in a one-dot chain line. Here, since the process is the printing process, the top end of the printing paper 158 is supplied up to a position which is immediately before a position of contact between a printing platen 162 and a thermal head 12a. This conveyance is achieved by stopping the stepping motor 28a upon detection of the top end of the printing paper 158 by a contact sensor or optical sensor in the sensor unit 26. The sensor is provided at the position immediately before the contact position.

It is to be noted that as the preparation for a case where the printing paper 158 as already printed exists in the supply/discharge path 160 that succeeds the contact position between the printing platen 162 and the thermal head 12a, the rotating force of the paper supply roller gear 152 is further transmitted from a sixth paper supply/discharge gear 164, seventh paper supply/discharge gear 166 and eighth paper supply/discharge gear 168 to a paper discharge roller gear 170 to thereby rotate counterclockwise the paper discharge roller 170. In correspondence with this counterclockwise rotation of the paper discharge roller gear 170, a paper discharge roller 172 coaxial with the paper discharge roller gear 170 discharges the already printed printing paper 158 into a tray (not illustrated) located outside the facsimile 1. Finally, the gear changeover solenoid 30a is set to "off". Next, stopping the stepping motor 28a (S3250) is executed with the result that supply of the excitation current to the stepping motor 28a is stopped (S3250).

Changeover of the gears from the paper supply/discharge mode to the printing mode is performed (S3300) as follows. First, the gear changeover solenoid 30a is set to "off". Then, the stepping motor 28a is rotated clockwise by a length corresponding to 21 pulses. As a result, the common gear 106 and the common sun gear 108 are each rotated counterclockwise with the result that the second lever 116 is rotated counterclockwise with the result that the second planetary gear 112 at the top end thereof is revolved counterclockwise and thus moves away from the first paper supply/discharge gear 134. The pawl 116a is carried into the retention recess 121a, whereby the rotation of the second lever 116 is stopped so that the second planetary gear 112 may be located at the position that is intermediate between the first paper supply/discharge gear 134 and the second reading gear 120 to thereby cause no rotating force to be transmitted from the second planetary gear 112 to any one of the first paper supply/discharge gear 134 and the second reading gear 120.

With regard to the first lever 114, the pawl 114a thereof is separated from the top end of the retention lever 121 with which the pawl 114a has theretofore contacted and is thereby rotated counterclockwise. The first planetary gear 110 is thereby revolved counterclockwise to abut on the first paper supply/discharge gear 134 and mesh with the same. In this way, a printing mode illustrated in FIG. 9 is achieved.

In this printing mode, a printing paper cueing processing (S3400) is performed next. That is, by outputting to the stepping motor 28a a forward rotation directional prescribed pulse number N1 corresponding to a first cueing length L1 of the printing paper 158, the forward rotational rotating force of the stepping motor 28a is transmitted to the first paper supply/discharge sun gear 148 through the output shaft 102, motor gear 104, common gear 106, common sun gear 108, first planetary gear 110, first paper supply/discharge gear 134, second paper supply/discharge gear 136, third paper supply/discharge gear 142, fourth paper supply/discharge gear 144 and fifth paper supply/discharge gear 146.

Since the first paper supply/discharge sun gear 148 is rotated clockwise, the lever 148a is swung clockwise, whereby the first paper supply/discharge planetary gear 150 at the top end thereof meshes with the eighth paper supply/discharge gear 168. As a result, the rotating force is transmitted from the eighth paper supply/discharge gear 168 to the seventh paper supply/discharge gear 166, sixth paper supply/discharge gear 164 and paper supply roller gear 152. Provided, however, that at this time the paper supply roller 154 coaxial with the paper supply roller gear 152 is arranged so that no rotating force may be applied thereto, and so the paper supply roller 154 rotates in a manner to follow the movement of the printing paper 158.

By the clockwise rotation of the second paper supply/discharge gear 136, a second paper supply/discharge planetary gear 174 at the top end of the lever 140 coaxial with the second paper supply/discharge gear 136 is meshed with a ninth paper supply/discharge gear 176. Accordingly, the rotating force of the second paper supply/discharge gear 136 is transmitted from the second paper supply/discharge sun gear 138 coaxial therewith to the second paper supply/discharge planetary gear 174, ninth paper supply/discharge gear 176 and printing platen gear 180. In this way, the printing platen 162 coaxial with the printing platen gear 180 are rotated counterclockwise.

Accordingly, the top end of the printing paper 158 which has already reached the position immediately before the contact position between the printing platen 162 and the thermal head 12a passes the contact position between the printing platen 162 and the thermal head 12a by the first cueing length L1 and then stops. It is to be noted that although a heat transfer ink sheet (not illustrated) exists previously between the printing platen 162 and the thermal head 12a, the printing paper 158 enters between the heat transfer ink sheet and the printing platen 162.

Next, printing of received data (S3500) is executed. That is, by pressing the thermal head 12a against the printing platen 162 side, the thermal head 12a is pressed, through the heat transfer ink sheet, against the printing paper 158 between the thermal head 12a and the printing platen 162. By moving the thermal head 12a in the main scan direction (perpendicular to the drawing sheet) and sequentially reading out the facsimile data received in the receiving buffer memory 20a, printing of the contents of the facsimile data is performed. By driving the stepping motor 28a by the extent corresponding to one line upon termination of each line printing of the thermal head 12a, the printing paper 158 is moved by the printing platen 162 along the supply/discharge path 160.

When having completed printing all the facsimile data items stored in the receiving buffer memory 20a, or when having completed printing the facsimile data of one page, the thermal head 12a is returned to its original document position, the received data printing processing (S3500) is terminated, and the excitation stop processing of the stepping motor 28a (S3550) is executed, whereby supply of the excitation current to the stepping motor 28a is stopped.

Changeover of the gears from the printing mode to the paper supply/discharge mode is performed (S3600) as follows. First, the gear changeover solenoid 30a is set to "on". As a result, the retention recess 121a of the retention lever 121 is disengaged from the pawl 116a of the second lever 116.

Next, the stepping motor 28a is rotated in reverse by a length corresponding to 36 pulses. As a result, the common gear 106 and the common sun gear 108 are rotated clockwise, with the result that the second lever 116 is rotated clockwise, with the result that the second planetary gear 112 at the top end thereof is revolved clockwise to abut on the first paper supply/discharge gear 134 and mesh with the same. The first lever 114 is also rotated clockwise, with the result that the first planetary gear 110 at the top end thereof is revolved clockwise to be separated from the first paper supply/discharge gear 134 and subsequently the pawl 114a of the first lever 114 abuts on the top end of the retention lever 121, with the result that the first planetary gear 110 is stopped at the position that is substantially intermediate between the first paper supply/discharge gear 134 and the first reading gear 118. In this way, the mechanical construction is returned to the paper supply/discharge mode illustrated in FIG. 8.

By rotating in reverse the stepping motor 28a in this state and thereby rotating counterclockwise the paper discharge roller 172, the already printed printing paper 158 remaining in the supply/discharge path 160 within the facsimile 1 is discharged into the tray (not illustrated) located outside the facsimile 1. Simultaneously with this discharging operation, by the counterclockwise rotation of the paper supply roller 154, the printing paper 158 in the paper supply tray 156 is conveyed as stated previously up to the position immediately before the contact position between the printing platen 162 and the thermal head 12a (S3700).

Next, the excitation stop processing (S3750) of the stepping motor 28a is performed, whereby supply of the excitation current to the stepping motor 28a is stopped. It is determined whether printing of the facsimile data has been completed (S3800). If nonprinted facsimile data remains ("NO" in step S3800), the flow returns to step S3300 in which printing continues to be performed. If printing of all the facsimile data is completed ("YES" in step S3800), then changeover of the gears from the paper supply/discharge mode to the initial mode is performed (S3900) as follows.

First, the gear changeover solenoid 30a is set to "off". Next, the stepping motor 28a is rotated clockwise by a length corresponding to 28 pulses. As a result, the common gear 106 and the common sun gear 108 are each rotated counterclockwise, whereby the first planetary gear 110 is revolved counterclockwise once jointly with the first lever 114 and thereby moves toward the first paper supply/discharge gear 134 side to thereby separate the pawl 114a of the first lever 114 from the top end of the retention lever 121. The second lever 116 is rotated counterclockwise, whereby the second planetary gear 112 at the top end thereof is separated from the first paper supply/discharge gear 134. When thereafter the second planetary gear 112 has moved to the position substantially intermediate between the first paper supply/discharge gear 134 and the second reading gear 120, the pawl 116a of the second lever 116 is carried into the retention recess 121a of the retention lever 121 receiving the pulling force in the counterclockwise rotational direction by the coil spring 30b. As a result, the second planetary gear 112 is stopped at this position.

The stepping motor 28a is rotated in reverse by a length corresponding to 30 pulses. Although the second planetary gear 112 is not moved by this reverse rotation because the pawl 116a of the second lever 116 is engaged with the retention recess 121 of the retention lever 121, the first lever 114 is rotated clockwise until the first planetary gear 110 contacts with the first reading gear 118. By rotating clockwise the stepping motor 28a by a length corresponding to 15 pulses, the first planetary gear 110 is moved to the position substantially intermediate between the first reading gear 118 and the first paper supply/discharge gear 134 and is stopped. In this way, the facsimile 1 is returned to the initial mode illustrated in FIG. 7. The excitation stop processing (S3950) of the stepping motor 28a is executed, whereby supply of the excitation current to the stepping motor 28a is stopped.

Turning back to FIG. 2, when the user operates the operation panel 4 to instruct data transmission, an original document reading process (S4000) is started followed by a transmissison process (S4500).

Figure 4:
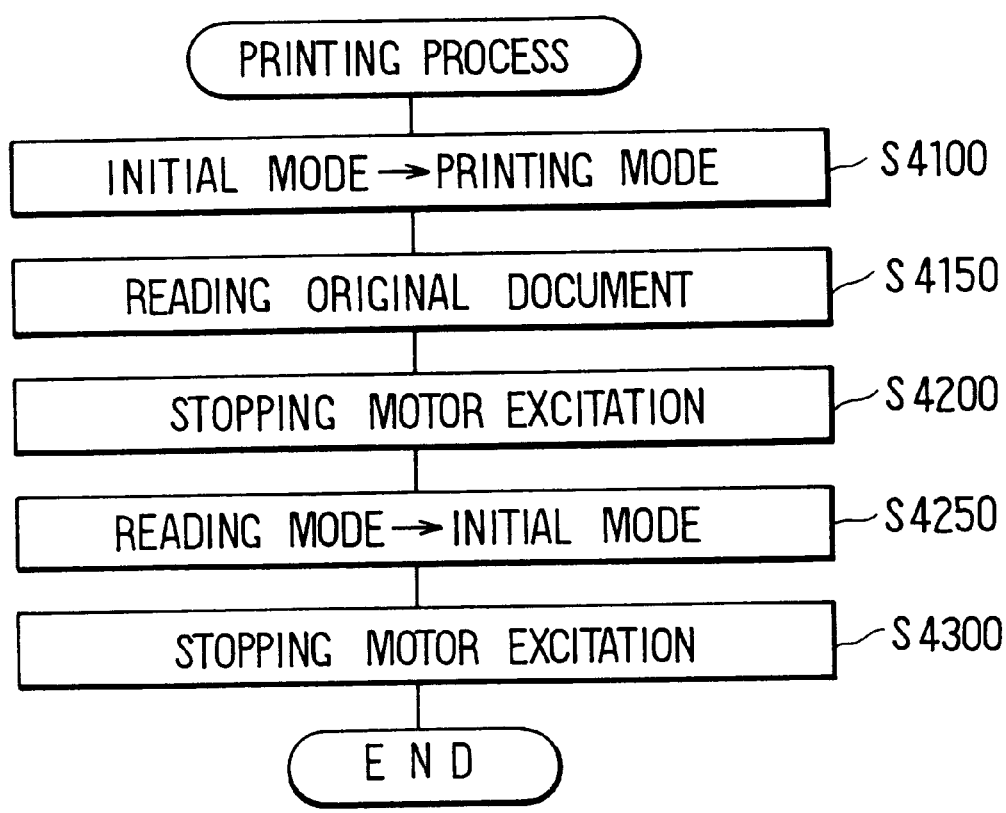
FIG. 4 is a flow chart illustrating an original document reading process in the facsimile control process.

First, as illustrated in FIG. 4, changeover of the gears from the initial mode to the reading mode is performed (S4100) as follows. First, the gear changeover solenoid 30a is set to "off" to thereby rotate in reverse the stepping motor 28a by a length corresponding to 13 pulses. By this reverse rotation, the common gear 106 is rotated clockwise to thereby cause the first planetary gear 110 to abut on the first reading gear 118 and mesh with the same. At this time, since the gear changeover solenoid 30a is kept "off", the pawl 116a of the second lever 116 is kept carried into the retention recess 121a of the retention lever 121, with the result that the second planetary gear 12 is kept located at the position between the first paper supply/discharge gear 134 and the second reading gear 120.

As a result, the reading mode illustrated in FIG. 10 is achieved. In this condition, the original document conveyance, reading and discharge processing (S4150) are executed. That is, the rotating force of the output shaft 102 is transmitted from the motor gear 104, common gear 106, common sun gear 108, first planetary gear 110, first reading gear 118 and second reading gear 120 to a first induction roller gear 122, whereby a first induction roller 122a coaxial with the first induction roller gear 122 is rotated clockwise. Also, the rotating force of the first induction roller gear 122 is transmitted to a third reading gear 124, fourth reading gear 126 and reading platen gear 128 to thereby cause the counterclockwise rotation of a reading platen 128a coaxial with the reading platen gear 128. Further, the rotating force of the fourth reading gear 126 is transmitted to a fifth reading gear 130 and then to a second induction roller gear 132 to thereby cause the clockwise rotation of a second induction roller 132a coaxial with the second induction roller gear 132.

As a result, an original document that has been inserted by the user from an insertion opening (not illustrated) into the facsimile 1 is induced by the first induction roller 122a, reading platen 128a and second induction roller 132a to be conveyed along an original document conveyance path 133. Upon detection of the top end of the original document by an original document sensor (not illustrated) disposed on the original document conveyance path 133 immediately before the reading platen 128a, the information of the original document is read by a reading sensor 10a provided opposing the reading platen 128a with a timing at which the top end thereof has reached the reading platen 128a.

Upon detection of the bottom end of the original document by the original document sensor, the reading of the original document by the reading sensor 10a is stopped with a timing at which the bottom end of the original document has reached the reading platen 128a, and, upon discharge of the original document from inside the facsimile 1, the original document reading process (S4150) is terminated. The information data of the original document read by the reading sensor 10a is accumulated in the RAM 20.

It is to be noted that in step S4150 a top end of the next original document has thereafter been already sensed by the original document sensor, the conveyance, reading and discharging processing in step S4150 are repeatedly executed. At the point in time when the processing of all the original documents have been completed, a transfer is made to the next process. The excitation stop processing (S4200) of the stepping motor 28a is executed, whereby supply of the excitation current to the stepping motor 28a is stopped.

Next, changeover of the gears from the reading mode to the initial mode is performed (S4250) as follows. First, the gear changeover solenoid 30a is set to "off" and then the stepping motor 28a is rotated clockwise by a length corresponding to 28 pulses. As a result, the common gear 106 and the common sun gear 108 are each rotated counterclockwise, whereby the first planetary gear 110 is moved toward the first paper supply/discharge gear 134 side jointly with the first lever 114. Also, since the pawl 116a of the second lever 116 is kept carried into the retention recess 121a of the retention lever 121 caused to receive the pulling force by the coil spring 30b in the counterclockwise rotational direction, the second planetary gear 112 is kept situated at its own present position.

The stepping motor 23a is rotated in reverse by a length corresponding to 30 pulses. Although in this reverse rotation the second planetary gear 112 is kept not moved because the pawl 116a of the second lever 116 is kept remaining in the retention recess 121a of the retention lever 121, the first planetary gear 110 moves away from the first paper supply/discharge gear 134 with the clockwise rotation of the first lever 114 and abuts on the first reading gear 118.

The above 28 pulse forward rotation and 30 pulse reverse rotation of the stepping motor 28a are performed for the purpose of keeping the state of the printing mode securely maintained in order to return to the initial mode accurately.

By rotating clockwise the stepping motor 28a, the first planetary gear 110 is moved to the position substantially intermediate between the first reading gear 118 and the first paper supply/discharge gear 134 and stopped. In this way, the facsimile 1 returns to the initial mode illustrated in FIG. 7. The excitation stop processing of the stepping motor 28a (S4300) is executed, whereby supply of the excitation current to the stepping motor 28a is stopped.

As illustrated in FIG. 2, the information data of the original document accumulated in the RAM 20 is transmitted as facsimile data to another facsimile that has been instructed by the user (S4500).

Figure 5:
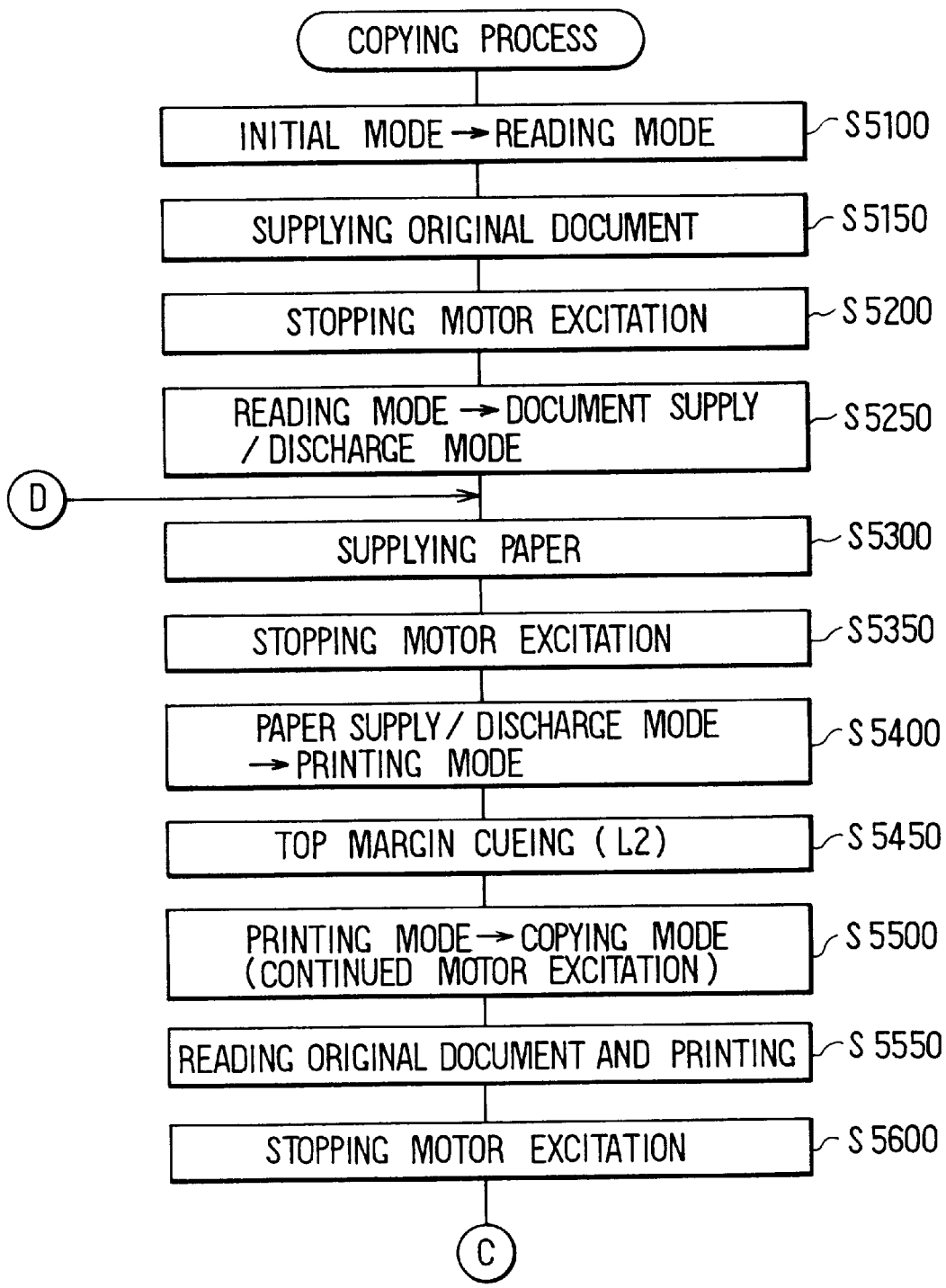
FIG. 5 is a flow chart illustrating one part of a copying process in the facsimile control process.
Figure 6:
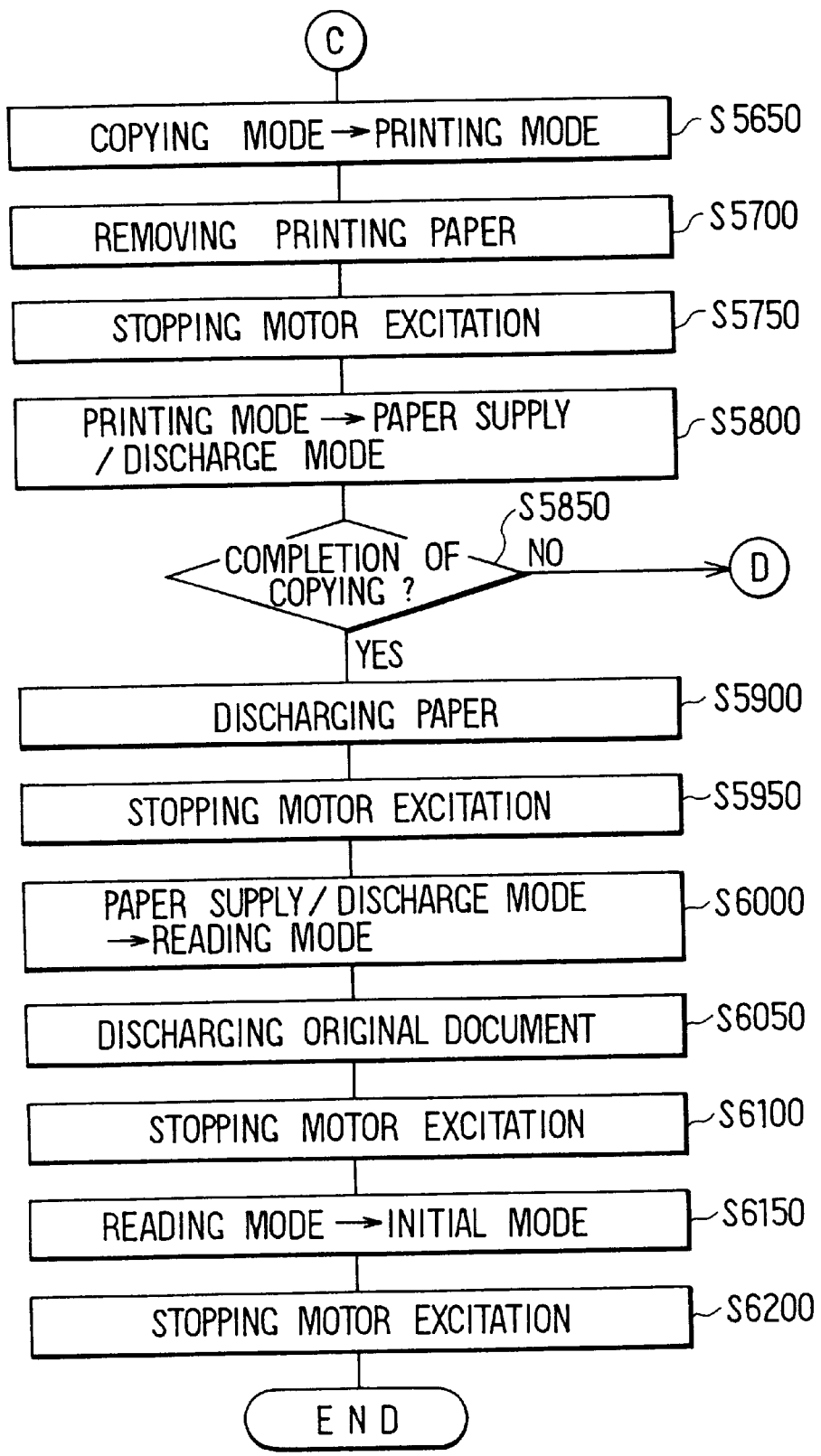
FIG. 6 is a flow chart illustrating the other part of the copying process in the facsimile control process.

In case where the user operates the operation panel 4 to instruct copying of the original document, a copying process (S5000) is started as illustrated in flow charts of FIGS. 5 and 6 according to the determination made in step S2000. It is to be noted that the copying process (S5000) is generally a combination of the reading process (S4000) and the printing process (S3000).

First, changeover of the gears from the initial mode to the reading mode is performed (S4100) as follows. First, the gear changeover solenoid 30a is set to "off" to thereby rotate in reverse the stepping motor 28a by a length corresponding to 13 pulses. By this reverse rotation, the common gear 106 is rotated clockwise to thereby cause the first planetary gear 110 to mesh with the first reading gear 118. At this time, since the gear changeover solenoid 30a is kept "off", the pawl 116a of the second lever 116 is kept carried into the retention recess 121a of the retention lever 121, with the result that the second planetary gear 112 is kept located at the position between the first paper supply/discharge gear 134 and the second reading gear 120.

As a result, the reading mode illustrated in FIG. 10 is achieved. In this condition, the original document conveyance processing (S5150) is executed. That is, the rotating force of the motor gear 104 is transmitted from the common gear 106, common sun gear 108, first planetary gear 110, first reading gear 118 and second reading gear 120 to the first induction roller gear 122, whereby the first induction roller 122a coaxial with the first induction roller gear 122 is rotated clockwise. Also, the rotating force of the first induction roller gear 122 is transmitted to the third reading gear 124, fourth reading gear 126 and reading platen gear 128 to thereby cause the counterclockwise rotation of the reading platen 128a coaxial with the reading platen gear 128.

Further, the rotating force of the fourth reading gear 126 is transmitted to the fifth reading gear 130 and then to the second induction roller gear 132 to thereby cause the clockwise rotation of the second induction roller 132a coaxial with the second induction roller gear 132.

As a result, the original document to be copied that has been inserted by the user from the insertion opening (not illustrated) into the facsimile 1 is induced by the first induction roller 122a to be conveyed along the original document conveyance path 133 and, upon detection of the top end of the original document for copying, is stopped as stated in connection with step S4150. The excitation stop processing (S5200) of the stepping motor 28a is executed, whereby supply of the excitation current to the stepping motor 28a is stopped.

Next, changeover of the gears from the reading mode to the paper supply/discharge mode is performed (S5250) as follows. First, the gear changeover solenoid 30a is set to "off" and then the stepping motor 28a is rotated clockwise by a length corresponding to 34 pulses. As a result, the common gear 106 and the common sun gear 108 are each rotated counterclockwise, whereby the first planetary gear 110 is moved toward the first paper supply/discharge gear 134 side jointly with the first lever 114 and abuts on the first paper supply/discharge gear 134 and is stopped. Since the pawl 116a of the second lever 116 is kept carried into the retention recess 121a of the retention lever 121, the second planetary gear 112 is kept situated at its position between the second planetary gear 112 and the second reading gear 120.

The gear changeover solenoid 30a is set to "on" to thereby rotate in reverse the stepping motor 28a by a length corresponding to 21 pulses. As a result, the retention recess 121a of the retention lever 121 is disengaged from the pawl 116a of the second lever 116 and the common gear 106 and the common sun gear 108 are each rotated clockwise. Therefore, the second planetary gear 112 abuts on the first paper supply/discharge gear 134 and meshes with the same. Although the first planetary gear 110 moves away from the first paper supply/discharge gear 134 jointly with the first lever 114 toward the first reading gear 118, the pawl 114a of the first lever 114 abuts on the top end of the retention lever 121, whereby the first planetary gear 110 is stopped at the position substantially intermediate between the first paper supply/discharge gear 134 and the first reading gear 118.

The gear changeover solenoid 30a is set to "off". At this time, since the pawl 116a of the second lever 116 upwardly pushes the retention lever 121 against the pulling force of the coil spring 30b, there is no possibility that the pawl 114a of the first lever 114 will be disengaged from the top end of the retention lever 121.

As a result, the paper supply/discharge mode illustrated in FIG. 8 is achieved. In this condition, the printing paper supply processing is executed (S5300). That is, as stated in connection with step S3200 (FIG. 3), by rotating in reverse the stepping motor 28a, the rotating force of the output shaft 102 and motor gear 104 is transmitted up to the paper supply roller gear 152. By the counterclockwise rotation of this paper supply roller gear 152, the paper supply roller 154 provided coaxially with the paper supply roller gear 152 draws out a single sheet of paper of the printing papers 158 stacked in the paper supply tray 156 and sends it out into the supply/discharge path 160 indicated in the one-dot chain line. Upon detection by the sensor of the fact that the top end of the printing paper 158 has come to the position immediately before the contact position between the printing platen 162 and the thermal head 12a, the conveyance of the printing paper 158 is stopped.

It is to be noted that in case where the printing paper 158 as already printed exists in the supply/discharge path 160 that succeeds the contact position between the printing platen 162 and the thermal head 12a the this printing paper is discharged as follows. That is, the rotating force of the paper supply roller gear 152 is further transmitted from the sixth paper supply/discharge gear 164, seventh paper supply/discharge gear 166 and eighth paper supply/discharge gear 168 to the paper discharge roller gear 170. Therefore, in correspondence with the counterclockwise rotation of the paper discharge roller gear 170, the paper discharge roller 172 coaxial with the paper discharge roller gear 170 discharges the already printed printing paper 158 completely from inside the facsimile 1.

The excitation stop processing of the stepping motor 28a is executed with the result that supply of the excitation current to the stepping motor 28a is stopped (S5350).

Next, changeover of the gears from the paper supply/discharge mode to the printing mode is performed (S5400) as described in connection with the step S3300. That is, first, the gear changeover solenoid 30a is set to "off". Then, the stepping motor 28a is rotated clockwise by a length corresponding to 21 pulses. As a result, the common gear 106 and the common sun gear 108 are each rotated counterclockwise with the result that the second lever 116 is rotated counterclockwise with the result that the second planetary gear 112 at the top end thereof moves away from the first paper supply/discharge gear 134. The pawl 116a is carried into the retention recess 121a, whereby the rotation of the second lever 116 is stopped so that the second planetary gear 112 may be located at the position intermediate between the first paper supply/discharge gear 134 and the second reading gear 120 to thereby cause no rotating force to be transmitted from the second planetary gear 112 to any one of the first paper supply/discharge gear 134 and the second reading gear 120.

Also, with regard to the first lever 114, the pawl 114a thereof is separated from the top end of the retention lever 121 on which the pawl 114a has theretofore abutted and is thereby rotate counterclockwise. The first planetary gear 110 thereby abuts on the first paper supply/discharge gear 134 and meshes with the same. In this way, a printing mode illustrated in FIG. 9 is achieved.

Next, the printing paper cueing processing (S5450) is performed. That is, by outputting to the stepping motor 28a a forward rotation directional prescribed pulse number N2 corresponding to a second cueing length L2 of the printing paper 158, the forward rotational rotating force of the stepping motor 28a is transmitted up to the first paper supply/discharge sun gear 148. Since the first paper supply/discharge sun gear 148 is rotated clockwise, the lever 148a is swung clockwise, whereby the first paper supply/discharge planetary gear 150 at the top end thereof meshes with the eighth paper supply/discharge gear 168. As a result, the rotating force is transmitted from the eighth paper supply/discharge gear 168 to the paper supply roller gear 152, provided, however, that at this time the paper supply roller 154 coaxial with the paper supply roller gear 152 is arranged so that no rotating force may be applied thereto, and so the paper supply roller 154 rotates in a manner to follow the movement of the printing paper 158. Also, by the clockwise rotation of the second paper supply/discharge gear 136, the second paper supply/discharge planetary gear 174 at the top end of the lever 140 coaxial with the second paper supply/discharge gear 136 is meshed with the ninth paper supply/discharge gear 176. Accordingly, the rotating force of the second paper supply/discharge gear 136 is transmitted from the second paper supply/discharge sun gear 138 coaxial therewith up to the printing platen gear 180. In this way, the printing platen 162 coaxial with the printing platen gear 180 are rotated counterclockwise.

Accordingly, the top end of the printing paper 158 which has already reached the position immediately before the contact position between the printing platen 162 and the thermal head 12a passes the contact position between the printing platen 162 and the thermal head 12a by the second cueing length L2 and then stops.

After the termination of the processing in step S5450, the excitation stop processing of the stepping motor 28a is not executed. That is, while the supply of the excitation current to the stepping motor 28a is being made, there is next performed the changeover of the gears from the printing mode to the copying mode (S5500). The reason for maintaining the supply of the excitation current is because when stopping the excitation current at the time immediately before the start of the copying mode in which a mechanical load exerted on the stepping motor 28a, a loss of synchronism between the excitation current and the motor rotation is likely to occur in the stepping motor 28a during the copying mode. The excitation current continues to be supplied for the purpose of preventing this loss in synchronization.

In step S5500, first, the gear changeover solenoid 30a is set to "off". Next, the stepping motor 28a is rotated in reverse by a length corresponding to 25 pulses. By this reverse rotation, the output shaft 102 and the motor gear 104 are each rotated counterclockwise to thereby rotate clockwise the common gear 106 to thereby move the first planetary gear 110 away from the first paper supply/discharge gear 134.

This 25 pulse reverse rotation is made for the purpose of causing the pawl 116a of the second lever 116 to be reliably carried into the retention recess 121a of the retention lever 121 when this pawl 116a has been disengaged therefrom for some reason or other. Accordingly, if the pawl 116a of the second lever 116 is kept still fitted in the retention recess 121a of the retention lever 121, the second planetary gear 112 is kept not moved and maintained as is.

Next, the gear changeover solenoid 30a is made "on" to thereby retract one end of the retention lever 121 against the pulling force of the coil spring 30b and thereby rotate clockwise the retention lever 121 and thereby disengage the retention recess 121a from the pawl 116a provided on the second lever 116.

Subsequently, the stepping motor 28a is rotated clockwise by a length corresponding to 33 pulses to thereby rotate counterclockwise the common gear 106 and thereby abut the second planetary gear 112 on the second reading gear 120 and mesh it with the same 120. Also, the first planetary gear 110 again abuts on the first paper supply/discharge gear 134 and meshes with the same 134 although the gear 110 has theretofore been kept away from the first paper supply/discharge gear 134 by the immediately preceding counterclockwise rotation of the stepping motor 28a.

Although the same applies also to other intermeshing operations, the above intermeshing operation is performed by the stepping motor 28a being rotated clockwise somewhat in excess for the purpose of ensuring the intermeshing of the gears during the copying mode. For this reason, the printing paper 158 slightly advances from its position cued in step S5450. This length of advance ΔL is determined beforehand by measurement. In connection with this length of advance ΔL, the first cueing length L1 in step S3400 and the second cueing length L2 in step S5450 are set so as to satisfy the following equation.

$$L1 \approx L2 + \Delta L$$

That is, the above prescribed pulse number N2 is set to a value that corresponds to the second cueing length L2 satisfying the above equation.

Accordingly, at the point in time when the step S5500 has been terminated, the actual cueing length of the printing paper 158, i.e., the margin feed length becomes substantially the same as the first cueing length L1 in step S3400 in the printing process. Therefore, in each of the printing process and copying process, the top end margin of the printing paper 158 printed and output becomes the same.

Here, although the original document for copying is also slightly advanced from the position where it has been stopped by being conveyed in step S5150, a small length of advance of the original document for copying raises no problem with reading as long as a sufficient magnitude of allowance for reading is set with respect to the reading sensor 10a and in addition has no relevancy to the upper end margin of the printing paper 158.

Subsequently, the gear changeover solenoid 30a is set to "off". Even when the gear changeover solenoid 30a is made "off", the top end of the pawl 116a of the second lever 116 upwardly pushes the retention lever 121 against the pulling force of the coil spring 30b. In this way, the copying mode illustrated in FIG. 11 is achieved.

In this copying mode, an original document reading/printing process (S5550) is executed. In this original document reading/printing process, an original document reading process similar to the reading of the original document executed in step S4150 is executed and, simultaneously, by the thermal head 12a being pressed against the printing platen gear 180 side, there is executed a printing process similar to the printing onto the printing paper 158 executed in step S3500. Provided, however, that in this copying process the printing is not the printing of the received facsimile data but the printing of the information data of the original document for copying that has been read in the original document reading process simultaneously executed.

That is, in the original document reading process, by rotating clockwise the stepping motor 28a, the second reading gear 120 is rotated counterclockwise through the output shaft 102, motor gear 104, common gear 106, common sun gear 108 and second planetary gear 112. Further, the rotating force is transmitted from the second reading gear 120 to the first induction roller gear 122 to thereby rotate clockwise the first induction roller 122a coaxial with the first induction roller gear 122. Also, the rotating force of the first induction roller gear 122 is transmitted to the third reading gear 124, fourth reading gear 126 and reading platen gear 128 to thereby rotate counterclockwise the reading platen 128a coaxial with the reading platen gear 128. Further, the rotating force of the fourth reading gear 126 is transmitted to the fifth reading gear 130 and then to the second induction roller gear 132 to thereby rotate clockwise the second induction roller 132a coaxial with the second induction roller gear 132.

As a result, the original document that has been inserted by the user from the insertion opening (not illustrated) into the facsimile 1 is induced by the first induction roller 122a to be conveyed along the original document conveyance path 133. Upon detection of the top end of the original document for copying by the original document sensor not illustrated at the position immediately before the reading platen 128a, the information of the original document for copying is read by the reading sensor 10a with a timing at which the top end thereof has reached the reading platen 128a. The information data of the original document for copying that has been read by the reading sensor 10a is temporarily accumulated in the buffer within the RAM 20.

In the printing process, the forward rotational rotating force of the motor unit 28 is transmitted to the first paper supply/discharge sun gear 148 through the output shaft 102, motor gear 104, common gear 106, common sun gear 108, first planetary gear 110, first paper supply/discharge gear 134, second paper supply/discharge gear 136, third paper supply/discharge gear 142, fourth paper supply/discharge gear 144 and fifth paper supply/discharge gear 146. Since the first paper supply/discharge sun gear 148 is rotated clockwise, the lever 148a is swung clockwise, whereby the first paper supply/discharge planetary gear 150 at the top end thereof meshes with the eighth paper supply/discharge gear 168. As a result, the rotating force is transmitted from the eighth paper supply/discharge gear 168 to the seventh paper supply/discharge gear 166, sixth paper supply/discharge gear 164 and paper supply roller gear 152. Provided, however, that at this time the paper supply roller 154 coaxial with the paper supply roller gear 152 is arranged so that no rotating force may be applied thereto, and so the paper supply roller 154 rotates in a manner to follow the movement of the printing paper 158.

Further, by the clockwise rotation of the second paper supply/discharge gear 136, the second paper supply/discharge planetary gear 174 at the top end of the lever 140 coaxial with the second paper supply/discharge gear 136 is meshed with the ninth paper supply/discharge gear 176. Accordingly, the rotating force of the second paper supply/discharge gear 136 is transmitted from the second paper supply/discharge sun gear 138 coaxial therewith to the second paper supply/discharge planetary gear 174, ninth paper supply/discharge gear 176 and printing platen gear 180. In this way, the printing platen 162 coaxial with the printing platen gear 180 are rotated counterclockwise. Accordingly, the printing paper 158 between the printing platen 162 and the heat transfer ink sheet is conveyed toward the paper discharge roller 172 along the supply/discharge path 160 after the printing thereof has been executed by the thermal head 12a.

When in this original document reading/printing process (S5550) the length of data corresponding to one page of the original document for copying has been printed onto a single sheet of paper of the printing papers 158, the excitation stop processing of the stepping motor 28a is next executed, whereby the supply of the excitation current to the stepping motor 28a is stopped (S5600).

Next, the gears are changed over from the copying mode to the printing mode (S5650). That is, first, the gear changeover solenoid 30a is set to "off". Next, the stepping motor 28a is rotated in reverse by a length corresponding to 50 pulses. By this reverse rotation, the output shaft 102 and the motor gear 104 are each rotated counterclockwise to thereby rotate clockwise the common sun gear 106 and thereby move the second lever 116 and the second planetary gear 112 away from the second reading gear 120 and thereby carry the pawl 116a of the second lever 116 into the retention recess 121a of the retention lever 121 and thereby stop the second planetary gear 112 at the position substantially intermediate between the second reading gear 120 and the first paper supply/discharge gear 134. At this time, the first planetary gear 110 moves once away from the first paper supply/discharge gear 134.

The stepping motor 28a is rotated clockwise to thereby rotate clockwise the output shaft 102 and the motor gear 104 and thereby rotate counterclockwise the common gear 106 and thereby cause the first planetary gear 110 to mesh again with the first paper supply/discharge gear 134. At this time, since the pawl 116a of the second lever 116 is kept fitted in the retention recess 121a of the retention lever 121, the second planetary gear 112 is maintained to be located at the position substantially intermediate between the second reading gear 120 and the first paper supply/discharge gear 134.

In the printing mode state, the stepping motor 28a is rotated clockwise to thereby rotate the printing platen gear 180 and the paper discharge roller 172 and thereby, when the bottom end of the printing paper 158 is being existent between the printing platen 162 and the thermal head 12a, remove this printed paper 158 from between these two elements (S5700).

Next, the excitation stop processing (S5750) of the stepping motor 28a is executed, whereby the supply of the excitation current to the stepping motor 28a is stopped.

The gears are changed over from the printing mode to the paper supply/discharge mode (S5800). That is, first, the gear changeover solenoid 30a is set to "on". Then, the stepping motor 28a is rotated in reverse by a length corresponding to 36 pulses. As a result, the retention recess 121a of the retention lever 121 is disengaged from the pawl 116a of the second lever 116, whereby the second planetary gear 112 abuts on the first paper supply/discharge gear 134 and meshes with the same. Further, the first planetary gear 110 moves away from the first paper supply/discharge gear 134 and, since the pawl 114a of the first lever 114 thereafter abuts on the top end of the retention lever 121, the first planetary gear 110 is stopped at the position substantially intermediate between the first paper supply/discharge gear 134 and the first reading gear 118. Then, the gear changeover solenoid 30a is set to "off". Even when the gear changeover solenoid 30a has been made "off", since the pawl 116a of the second lever 116 disengaged from the retention recess 121a of the retention lever 121 stops the return of the retention lever 121 against the pulling force of the coil spring 30b, there is no possibility that the pawl 114a of the first lever 114 will be disengaged from the top end of the retention lever 121.

Thus, the mechanical arrangement of the facsimile 1 returns to the paper supply/discharge mode illustrated in FIG. 8. It is determined whether the copying process has been completed (S5850). Upon detection by the original document sensor of the fact that a next original document for copying exists at the position immediately before the position of the reading sensor 10a, since it is needed to subsequently copy the original document for copying ("NO" in step S5850), the flow returns to the processing in step S5300. It is to be noted that with regard to the second original document for copying and subsequently original documents for copying, discharge of the printing paper 158 is also performed in step S5300 simultaneously with supply thereof and, in step S5550, discharge of the original document for copying is simultaneously performed. Accordingly, with regard to each of the second and subsequent original documents for copying, also, the information thereof is formed on the printing paper 158 according to the above processing, and the processings in steps from S5300 to S5800 are repeatedly executed until the original documents for copying are all printed out.

If no original document for copying remains ("YES" in step S5850), in the paper supply/discharge mode state, the already printed printing papers 158 are discharged (S5900) through the counterclockwise rotation of the paper discharge roller 172 made due to the reverse rotation of the stepping motor 28a. The excitation stop processing (S5950) of the stepping motor 28a is executed, whereby the supply of the excitation current to the stepping motor 28a is stopped.

Next, the gears are changed over from the paper supply/discharge mode to the reading mode (S6000). That is, first, the gear changeover solenoid 30a is set to "off". Next, the stepping motor 28a is rotated clockwise by a length corresponding to 45 pulses. As a result, the second planetary gear 112 is revolved counterclockwise, the pawl 116a is carried into the retention recess 121a of the retention lever 121, and the second planetary gear 112 is thereby stopped at the position substantially intermediate between the first paper supply/discharge gear 134 and the second reading gear 120.

The stepping motor 28a is rotated in reverse by a length corresponding to 40 pulses. As a result, the first lever 114 that has once abutted on the first paper supply/discharge gear 134 due to the 45 pulse forward rotation returns toward the first reading gear 118. However, since the retention lever 121 is rotated counterclockwise by the extent to which the pawl 116a has been carried into the retention lever 121a, the top end of the retention lever 121 is deviated from the direction in which the pawl 114a of the first lever 114 advances, whereby the pawl 114a of the first lever 114 does not abut on the top end of the retention lever, whereby the first planetary gear 110 abuts on the first reading gear 118 and meshes with the same. As a result, the mechanism returns to the reading mode illustrated in FIG. 10.

In the reading mode, by rotating in reverse the stepping motor 28a, the first induction roller gear 122, reading platen gear 128, second induction roller gear 132, etc. are rotated to thereby convey the original document for copying that remains within the facsimile 1 and thereby completely discharge it to the outside of the facsimile 1 (S6050). The excitation stop processing (S6100) of the stepping motor 28a is executed, whereby the supply of the excitation current to the stepping motor 28a is stopped.

The gears are changed over from the reading mode to the initial mode (S6150) as follows. First, the gear changeover solenoid 30a is set to "off" and then the stepping motor 28a is rotated clockwise by a length corresponding to 28 pulses. As a result, the common gear 106 and the common sun gear 108 are rotated counterclockwise. As a result, the first planetary gear 110 is moved toward the first paper supply/discharge 134 side jointly with the first lever 114. Also, since the pawl 116a of the second lever 116 is kept fitted in the retention recess 121a of the retention lever 121, the second lever 116 and the second planetary gear 112 are maintained to be located at their positions.

Then, the stepping motor 28a is rotated in reverse. Although in this reverse rotation the second planetary gear 112 is kept not moved because the pawl 116a of the second lever 116 is kept fitted in the retention recess 121a of the retention lever 121, the first planetary gear 110 moves away from the first paper supply/discharge gear 134 with the clockwise rotation of the first lever 114 and abuts on the first reading gear 118.

The 28 pulse forward rotation and 30 pulse reverse rotation of the stepping motor 28a are performed for the purpose of ensuring the reading mode as it is in order to accurately return to the initial mode.

By rotating clockwise the stepping motor 28a by a length corresponding to 15 pulses, the first planetary gear 110 is moved to the position substantially intermediate between the first reading gear 118 and the first paper supply/discharge gear 134 and stopped. In this way, the facsimile 1 returns to the initial mode illustrated in FIG. 7. The excitation stop processing (S6200) of the stepping motor 28a is executed, whereby the supply of the excitation current to the stepping motor 28a is stopped.

In this way, the processes involved are executed and thereafter the flow returns to step S2000 in which wait is made for the reception of the facsimile machine data or for the instruction made by the user. It is to be noted that although FIG. 2 illustrates only the reception, transmission and copy processes alone, a heat transfer ink sheet take-up processing, various setting processings, etc. can be selected as other processings.

In this embodiment, the cueing of the printing paper (step S5450) in the printing mode in the copying process is only performed by the second cueing length L2 which is smaller by ΔL compared with the cueing of the printing paper (step S3400) in the printing process performed in other than the copying process. This shortage of cueing is compensated for by the length of advance ΔL that is made when meshing the first planetary gear 110 in order to switch to the copying mode. As a result, the actual margin of the printing paper 158 becomes the same between the printing process and the copying process.

In this embodiment, when meshing the first planetary gear 110 in order to make a transfer to the copying mode, the actual printing paper 158 is inconveniently advanced and so, when cueing the printing paper in the copying process (S5450), the cueing length has been set to be small compared with that provided when cueing the printing paper in the printing process (step S3400) other than the copying process. However, in the case of a gear mechanism wherein the printing paper 158 comes back when meshing the first planetary gear 110 in order to make a transfer to the copying mode, when cueing the printing paper in the copying process (S5450), the cueing length is set to be larger compared with that provided when cueing the printing paper in the printing process (step S3400) other than the copying process.

In this embodiment, a combination of the first paper supply/discharge gear 134, second paper supply/discharge gear 136, second paper supply/discharge sun gear 138, lever 140, third paper supply/discharge gear 142, fourth paper supply/discharge gear 144, fifth paper supply/discharge gear 146, first paper supply/discharge sun gear 148, lever 148a, first paper supply/discharge planetary gear 150, paper supply roller gear 152, paper supply roller 154, printing platen 162, sixth paper supply/discharge gear 164, seventh paper supply/discharge gear 166, eighth paper supply/discharge gear 168, paper discharge roller gear 170, paper discharge roller 172, second paper supply/discharge planetary gear 174, ninth paper supply/discharge gear 176 and printing platen gear 180 operate as a printing paper conveyance mechanism. A combination of the first reading gear 118, second reading gear 120, first induction roller gear 122, first induction roller 122a, third reading gear 124, fourth reading gear 126, reading platen gear 128, reading platen 128a, fifth reading gear 130, second induction roller gear 132 and second induction roller 132a operate as an original document conveyance mechanism. A combination of the common gear 106, common sun gear 108, first planetary gear 110, second planetary gear 112, first lever 114, pawl 114a, second lever 116, pawl 116a, retention lever 121, retention recess 121a and coil spring 30b operate as a switching mechanism.

Although the above embodiment is applied to a facsimile, it may be also applied to, for example, a copying machine having a printer function and, in this case, the processes in FIGS. 5 and 6 are executed as those for the copying machine and the process in FIG. 3 is executed as that for the printer.

Further, the above embodiment may be modified or changed without departing from the spirit and scope of the invention.

I claim:

1. A printing control apparatus comprising:
   a printing unit for performing printing onto a printing paper;
   a reading unit for reading information of an original document;
   a printing paper conveyance mechanism for conveying the printing paper;
   an original document conveyance mechanism for conveying the original document;
   a rotary member for producing a rotating force;
   a switching mechanism including an intermediary unit driven by the rotary member for switching operation modes among a reading mode, printing mode and a copying mode in accordance with a position of revolution thereof around the rotary member, the intermediary member being for transmitting the rotating force of the rotary member to only the original document conveyance mechanism in the reading mode, to only the printing paper conveyance mechanism in the printing mode, and to both of the printing paper conveyance mechanism and the original document conveyance mechanism simultaneously in the copying mode; and
   a control unit for, by driving the switching mechanism, selecting one from a plurality of processes that include a printing process for executing the printing mode to thereby convey the printing paper by the printing paper conveyance mechanism and thereby pass the printing paper through the printing unit to thereby perform printing onto the printing paper in the printing unit, a reading process for executing the reading mode to thereby convey the original document by the original document conveyance mechanism and thereby pass the original document through the reading unit to thereby perform reading the original document in the reading unit, and a copying process for executing the copying mode to thereby convey the original document by the original document conveyance mechanism and thereby pass the original document through the reading unit to thereby perform reading of the original document in the reading unit and simultaneously convey the printing paper by the printing paper conveyance mechanism and thereby pass the printing paper through the printing unit to thereby perform printing onto the printing paper in the printing unit,
   wherein the control unit executes the printing mode immediately before the execution of the copying mode in the copying process to thereby perform cueing of the printing paper, and, when performing this cueing, differentiates a top margin feed length corresponding to a top margin of the printing paper from that corresponding to the cueing of the printing paper in the printing mode in other than the copying process, thereby making actual margins provided on the printing papers substantially the same between the respective processes.

2. The printing control apparatus as in claim 1, wherein:
   the intermediary mechanism includes a combination of a sun gear and a planetary gear unit; and
   the switching mechanism is arranged such that the planetary unit meshed with the sun gear transmit the rotating force of the rotary member to only the printing paper conveyance mechanism, only the original document conveyance mechanism or both of the printing paper conveyance mechanism and the original document conveyance mechanism by being located at the positions of revolution of the planetary gear unit around the sun gear which rotates with the rotary member, thereby realizing one of the printing mode, reading mode and copying mode.

3. The printing control apparatus as in claim 2, wherein:

the planetary gear unit includes a first planetary gear engageable with the printing paper conveyance mechanism and a second planetary gear engageable with the original document conveyance mechanism; and the switching mechanism is so arranged as to cause, at the printing mode, the first planetary gear to be meshed with the printing paper conveyance mechanism by adjusting the position of revolution of the first planetary gear to thereby transmit the rotating force of the rotary member to the printing paper conveyance mechanism, at the reading mode, the second planetary gear to be meshed with the original document conveyance mechanism by adjusting the position of revolution of the second planetary gear to thereby transmit the rotating force of the rotary member to the original document conveyance mechanism, and, at the copying mode, the first planetary gear to be meshed with the printing paper conveyance mechanism by adjusting the position of revolution of the first planetary gear to thereby transmit the rotating force of the rotary member to the printing paper conveyance mechanism, and the second planetary gear to be meshed with the original document conveyance mechanism by adjusting the position of revolution of the second planetary gear to thereby transmit the rotating force of the rotary member to the original document conveyance mechanism.

4. The printing control apparatus as in claim 3, wherein:

the control unit is so arranged as to cause, in the printing mode executed immediately before the execution of the copying mode in the copying process, the first planetary gear to be meshed with the printing paper conveyance mechanism by adjusting the position of revolution of the first planetary gear to thereby transmit the rotating force of the rotary member to the printing paper conveyance mechanism, thereby performing cueing of the printing paper, and when performing this cueing, lessen the margin feed length compared with that prepared in the printing mode for cueing the printing paper in a process other than the copying mode, thereby making the actual margins provided on the printing paper substantially the same between the respective processes.

5. The printing control unit as in claim 1, wherein:

the reading unit is provided in a facsimile for transmitting information of the original document to another facsimile; and the printing unit is provided in the facsimile for printing information received from the another facsimile onto the printing paper.

6. A printing control method for an apparatus having a printing unit for performing printing onto a printing paper fed by a paper conveyance mechanism, a reading unit for reading information of an original document fed by a document conveyance mechanism, and a motor selectively engageable with the conveyance mechanisms, the method comprising the steps of:

(a) driving the motor to feed the printing paper by the paper conveyance mechanism to the printing unit;

(b) driving, after the driving step (a), the motor further to feed the printing paper a predetermined length by the paper conveyance mechanism through the printing unit to provide a top margin on the printing paper, the driving step (b) being differentiated for a printing process and a copying process to follow to thereby differentiate the predetermined length; and (c) driving, after the driving step (b), the motor still further to feed the printing paper through the printing unit by the paper conveyance mechanism during the printing process and the reading process, the driving step (c) also driving the document conveyance mechanism simultaneously with the paper conveyance mechanism to feed the document through the reading unit only during the copying process.

7. The printing control method as in claim 6, further comprising the step of:

(d) driving the motor, between the driving steps (b) and (c), to assure an engagement of the paper conveyance mechanism with the motor for the printing process and the copying process while feeding the printing paper further through the printing unit, the driving step (b) being differentiated for the printing process and the copying process.

8. The printing control method as in claim 7, wherein:

total lengths of feeding the printing paper by the driving steps (b) and (d) are substantially uniform between the printing process and the copying process.

9. The printing control method as in claim 6, wherein:

the motor is a stepping motor which is driven by an excitation current; and the excitation current to the stepping motor is discontinued and continued between the driving steps (b) and (c) in cases of the printing process and the copying process, respectively.

10. The printing control method as in claim 6, wherein:

the reading unit and the printing unit are provided in a facsimile having a memory for storing information read by the reading unit and to be printed.

11. A memory unit for storing a computer readable printing control program for an apparatus having a printing unit for performing printing onto a printing paper fed by a paper conveyance mechanism, a reading unit for reading information of an original document fed by a document conveyance mechanism, and a motor selectively engageable with the conveyance mechanisms, the memory unit comprising:

a first storage area storing a first program for driving the motor to feed the printing paper by the paper conveyance mechanism to the printing unit;

a second storage area storing a second program for driving, after the driving of the motor by the first program, the motor further to feed the printing paper a predetermined length by the paper conveyance mechanism through the printing unit to provide a top margin on the printing paper, the driving of the motor by the second program being differentiated for a printing process and a copying process to follow to thereby differentiate the predetermined length; and a third storage area storing, after the driving of the motor by the second program, the motor still further to feed the printing paper through the printing unit by the paper conveyance mechanism during the printing process and the reading process, the driving of the motor by the third program also driving the document conveyance mechanism simultaneously with the paper conveyance mechanism to feed the document through the reading unit only during the copying process.

* * * * *